Dec. 26, 1939.  H. J. KAUFMAN  2,184,998

METHOD OF CONDITIONING AIR

Filed June 24, 1936  2 Sheets-Sheet 1

INVENTOR.
Hiram Joseph Kaufman

Dec. 26, 1939.  H. J. KAUFMAN  2,184,998
METHOD OF CONDITIONING AIR
Filed June 24, 1936  2 Sheets-Sheet 2
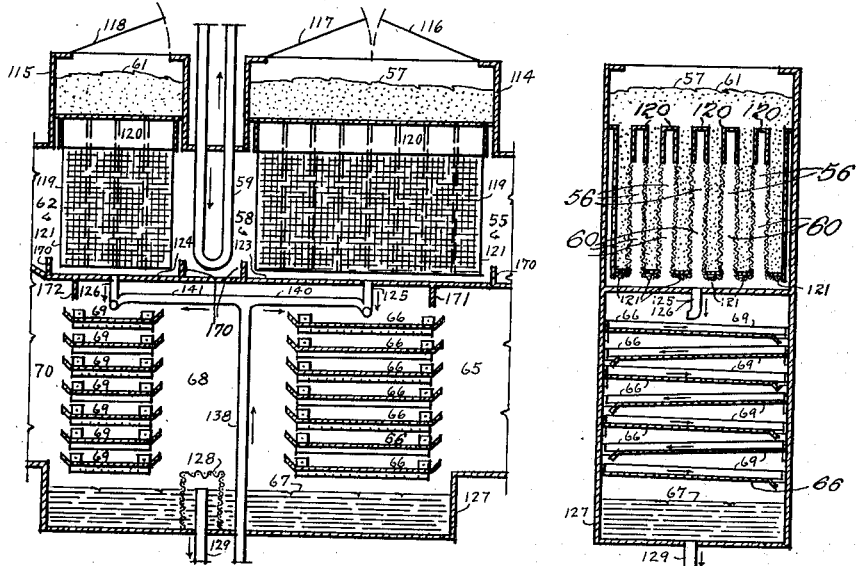
FIG. 2.   FIG. 3.
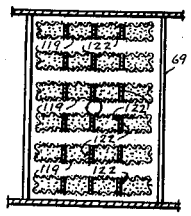 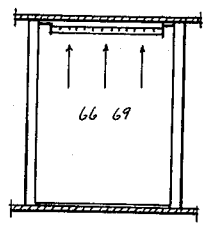 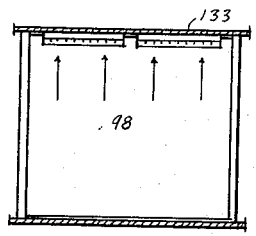
FIG. 4.   FIG. 5.   FIG. 6.
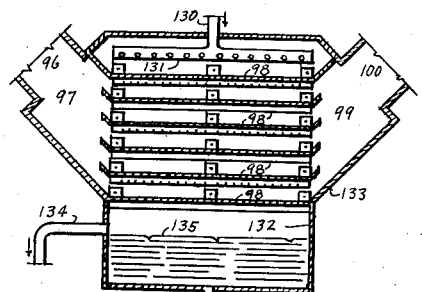 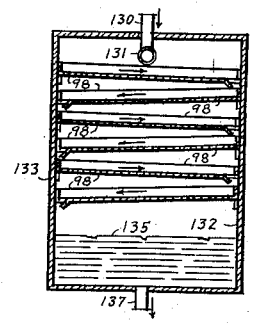
FIG. 7.   FIG. 8.
INVENTOR.
Hiram Joseph Kaufman Patented Dec. 26, 1939

2,184,998

UNITED STATES PATENT OFFICE 2,184,998

METHOD OF CONDITIONING AIR

Hiram Joseph Kaufman, Detroit, Mich.

Application June 24, 1936, Serial No. 87,027

2 Claims. (Cl. 183—4)

The present invention relates to a method of conditioning air and particularly to the use of comparatively cheap, hygroscopic by-products such as calcium chloride for the dehumidification of air.

An object of the invention is to provide a method of using hygroscopic materials for dehumidification which is economical in its operation and controllable to give the desired results.

Another object is to provide a method of using hygroscopic material for dehumidification in which the treated air is passed in predetermined proportions along different paths in contact with solid and liquified material and then commingled.

A further object is to provide a method of using hygroscopic material for dehumidification in which air is flowed along different paths, at least one containing solid material and another liquefied material, and balancing the flows of air so as to give the desired humidity when commingled with a minimum of liquification of the solid material.

Referring to the drawings:

Fig. 2 is a section through the air passages of the solid dehydrators and through the solution dehydrators.

Fig. 3 is a transverse section through the solid and solution dehydrators.

Fig. 4 is a plan section through the smaller solid dehydrator.

Fig. 5 is a plan section through the smaller solution dehydrator.

Fig. 6 is a plan section through the solution evaporator.

Fig. 7 is a section through the solution evaporator.

Fig. 8 is a transverse section through the solution evaporator.

Figure 1:
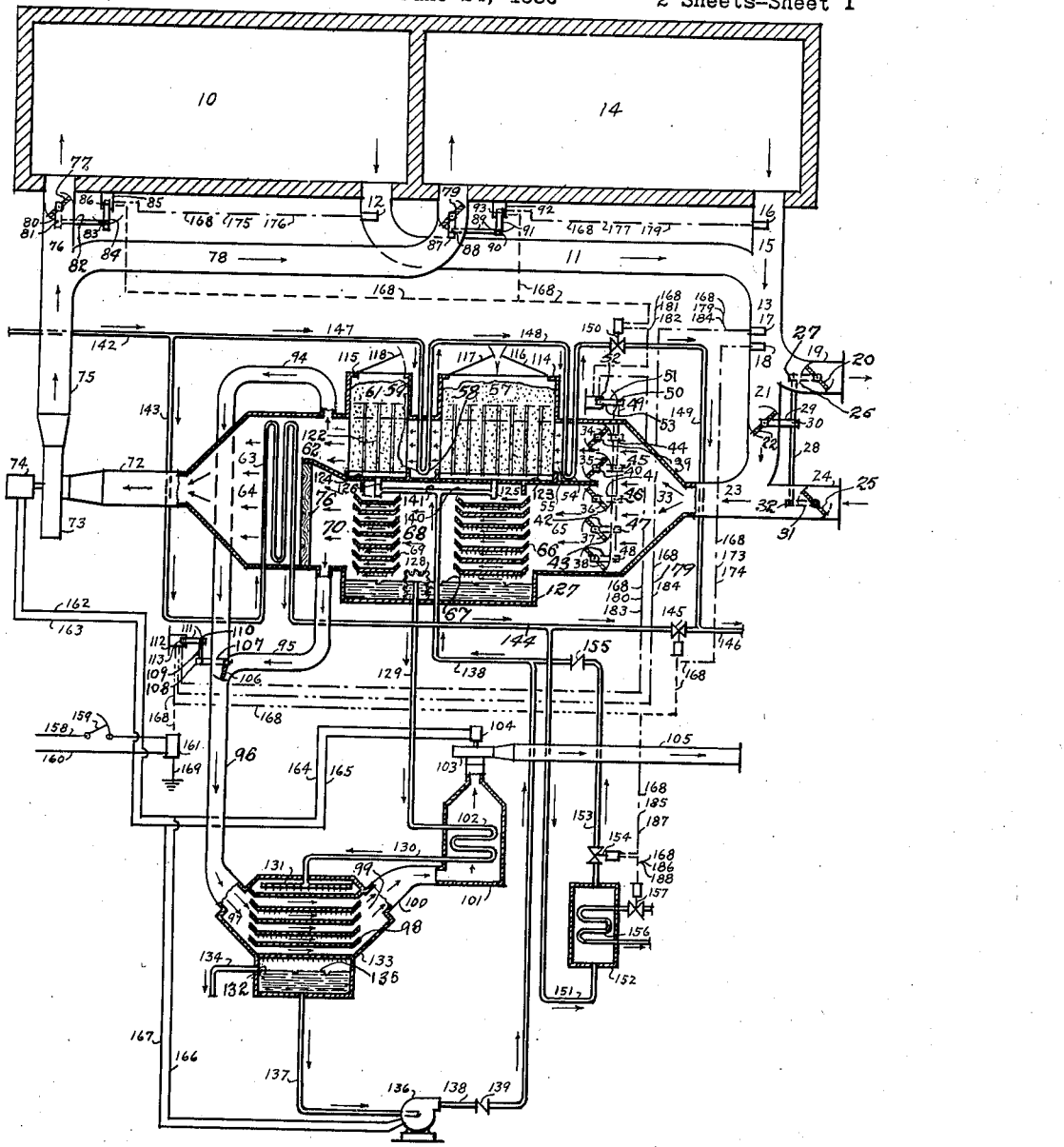
Fig. 1 is a diagram, showing the air conditioning and solution reconcentrating apparatus, the rooms to be air conditioned, and the accessories necessary therefor.

Referring particularly to Fig. 1: air is drawn from the space 10 into the duct 11 in contact with the thermostat 12 and into the return duct 13. Air is also drawn from the space 14 into the duct 15 in contact with the thermostat 16 and into the said return duct 13 in contact with the humidostat 17 and the thermostat 18 and discharged to the exterior air through the duct 19 controlled by the damper 20 or passed through the recirculated air duct 21 controlled by the damper 22 and into the inlet duct 23. Fresh air is drawn from outside through the duct 24 controlled by the damper 25 into the said inlet duct 23.

The said damper 20 is operated by the lever 26 the pivot 27 and the rod 28. The said damper 22 is operated by the lever 29 and the pivot 30 which is attached to the said rod 28. The said damper 24 is operated by the lever 31 the pivot 32 and the said rod 28 which operates the three said dampers at the same time with the said dampers 20 and 24 working oppositely to the said damper 22.

Air is drawn from the said duct 23 into the space 33 and proportioned into two streams by means of the dampers 34, 35, 36, 37, and 38, operated by the levers 39, 40, 41, 42, and 43, attached to the pivots 44, 45, 46, 47, and 48, which are attached to the rod 49. The said dampers 34 and 35 work oppositely to the said dampers 36, 37, and 38, and are moved by means of the said rod 49 attached to the pivot 50 of the damper motor lever 51 which is moved by the damper motor 52 around the pivot 53.

Air passing the said dampers 34 and 35 contacts the cooling coil 54 in the space 55, then through air passages 56 in the hygroscopic solid 57 into the space 58 (the said air passages 56 are shown in another view) contacting the cooling coil 59, then through air passages 60, Fig. 3, in the hygroscopic solid 61 into the space 62 passing the cooling coil 63 and into the space 64.

Air passing the dampers 36, 37, and 38 passes through the space 65 between the trays 66 containing hygroscopic solution 67, through the space 63 between the trays 69 containing hygroscopic solution 67, through the space 70, through the filter and resistance unit 71, and passes the said cooling coil 63 into the space 64.

Air is drawn from the space 64 through the duct 72 by the fan 73 driven by the motor 74 and discharged into the duct 75, where it is divided into two flows one of which passes through the duct 76 controlled by the damper 77 into the said space 10 and the other passes through the duct 78 controlled by the damper 79 into the said space 14.

The said damper 77 is operated by the lever 80 the pivot 81 the rod 82 the pivot 83 and the damper motor lever 84 which is moved by the damper motor 85 around the pivot 86. The said damper 79 is operated by the lever 87, the pivot 88, the rod 89, the pivot 90, and the damper motor lever 91 which is moved by the damper motor 92 around the pivot 93.

Extremely dry air is drawn from the space 62 through the duct 94 and normally dry air is drawn from the space 70 through the duct 95 into the duct 96 into the space 97 between the trays 98 containing hygroscopic solution 67 into the space 99 through the duct 100 into the heat exchanger 101 in contact with the coil 102 containing hygroscopic solution 67 by the fan 103 driven by the motor 104 and discharged to the atmosphere through the duct 105. The proportionate amounts of extremely dry and normally dry air are controlled by the damper 106 which is moved by the lever 107, the pivot 108, the rod 109, the pivot 110, and the damper motor lever 111 which is moved by the damper motor 112 around the pivot 113.

Hygroscopic material, in solid form, 57 and 61, is periodically fed into the hoppers 114 and 115 through the doors 116, 117, and 118 and slides down the containers 119. The upper portion 120 of each of the said containers 119 is formed of solid metal to keep the air from contacting the said hygroscopic material 57 and 61 in order to prevent the hygroscopic solids from caking together due to the absorption of moisture from the air and to allow the free flowing of the hygroscopic solids down into the said containers 119 from the said hoppers 114 and 115. The lower portion 121 of the said containers 119 is formed of wire cloth or perforated metal to allow vapors to pass from the air to the hygroscopic material. The said containers 119 are divided into cells by the vertical members 122 which hold the sides in their normal shape and have smooth surfaces exposed to the hygroscopic material to allow it to settle down in the said containers 119 due to the melting effect caused by absorbing vapors from the air, thereby allowing fresh hygroscopic material to slide into the said containers 119 from the said hoppers 114 and 115.

Hygroscopic solution flows down the sides of the said containers 119 to the collecting pans 123 and 124, then down the drains 125 and 126 and zigzags on the sloping trays 66 and 69, at right angles to the air flow, to the collecting tank 127. The freshly dissolved hygroscopic material forms a saturated solution which gradually becomes diluted due to vapors absorbed from the air passing between the trays 66 and 69.

The purpose of the filter and resistance unit 71 is to equalize the static pressure loss of the two air flows through the apparatus.

Diluted hygroscopic solution 67 passes through the strainer 128 into and down the pipe 129 through the coil 102 of the heat exchanger 101, then through the pipe 130 into the perforated pipe 131 and zigzags on the sloping trays 98, at right angles to the air flow, to the collecting tank 132 of the solution evaporator 133. The said solution evaporator 133 is provided with the overflow pipe 134 to allow the accumulated excess of solution to waste away. The amount of excess solution increases and decreases with the amount of fresh hygroscopic material added, which increases and decreases with the amount of extremely dry air required to regulate the humidity to the desired degree.

Reconcentrated hygroscopic solution 135 flows down to the circulating pump 136 through the pipe 137 and is discharged through the pipe 138, the check valve 139 to the branch pipes 140 and 141 into the drain pipes 125 and 126 where it is mixed with the fresh hygroscopic solution and drains to the trays 66 and 69 where it flows zigzag over the said trays 66 and 69 as before described.

Cooling water is supplied to the system through the pipe 142 through the branch pipe 143 to the said cooling coil 63 and discharged through the pipe 144 controlled by the motorized valve 145 to the waste pipe 146. Cooling water is also taken from the pipe 142 by the branch pipe 147 to the cooling coil 59 and discharged through the pipe 148 to the cooling coil 54 and discharged through the pipe 149 controlled by the motorized valve 150 to the waste pipe 146.

In order to prevent the humidity of the leaving air going below a predetermined degree, tempered water is taken from the said pipe 144 by the pipe 151 through the water storage tank 152 through the pipe 153 controlled by the motorized valve 154 through the check valve 155 into the said pipe 138 where it is mixed with the reconcentrated hygroscopic solution 135. In case this supply of tempered water is not sufficient to prevent the humidity from going below the said predetermined degree, then the temperature of the said tempered water is increased in the said storage tank 152 by means of heat supplied through the steam or hot water heating coil 156 controlled by the motorized valve 157, to increase the vapor pressure of the reconcentrated hygroscopic solution in order to prevent the absorption of moisture from the air by the said reconcentrated hygroscopic solution.

Electric power is supplied to operate the system by the positive wire 158 controlled by the switch 159 and the negative wire 160 leading to the low voltage transformer 161 with branches taken off for the pump and fan motors. Power is supplied to the main fan motor 74 by the positive wire 162 and the negative wire 163, to the auxiliary fan motor 104 by the positive wire 164 and the negative wire 165, and to the circulating pump motor 136 by the positive wire 166 and the negative wire 167 and these motors are simultaneously started and stopped by the closing and opening of the said switch 159. A positive wire 168 is taken from the said low voltage transformer 161 to the said damper motors 52, 85, 92, and 112 and to the said motorized valves 145, 150, and 154. The low voltage negative wire 169 is shown grounded. This said negative wire 169 also connects with the negative side of the said damper motors 52, 85, 92, and 112 and the motorized valves 145, 150, and 154, but this connection is not shown on the drawings. Three wire circuits consisting of one positive wire and two negative wires are taken from the said damper motors and motorized valves to the previously mentioned thermostats and humidostat and their action will be described later. The terms positive and negative are used throughout the description to define the supply and return wires of an alternating current circuit when the current is flowing in one direction only.

Fig. 2 to Fig. 8, inclusive, illustrate more in detail the various parts as previously referred to in the general description of Fig. 1. Referring to Fig. 2: the collecting pans 123 and 124 are provided with raised portions 170 to cause the hygroscopic solution to flow down the drains 125 and 126. The trays 66 and 69 are bent up at an angle at the ends transverse to the air flow to obstruct the air flow as little as possible, to attain intimate contact between the air and the hygroscopic solution at all points, and to direct the flow of the hygroscopic solution transversely to that of the air. The air flow over the top trays 66 and 69 is made equal to that between the said trays by means of the baffles 171 and 172. The air flow under the said trays 66 and 69 is made equal to that between the said trays by means of the overflow and drain pipe 129 which controls the level of the solution in the collecting tank 127. The greater proportion of the vapor absorption is done in the first stage both in the solid dehydrator and in the solution dehydrator and this requires greater storage capacity for the hygroscopic material, greater amount of hygroscopic solid surface exposed to the air stream, and a greater amount of hygroscopic solution surface exposed to the air stream. The amount of dehydration in the second stage solid dehydrator is that due to the lowering of the air temperature effected by the cooling coil 59. The solution dehydrators are proportioned to the solid dehydrators which they serve. Fig. 3 shows the lower edge bent down to form a drip at the alternate sides of the trays 66 and 69, which is shown in plan in Fig. 5. This drip edge is open the greater portion of the length which prevents the accumulation of dirt or other sediment and is notched at regular intervals to break up the surface tension of the solution and cause it to drip in a series of small streams in order to distribute the solution evenly over the surface of the trays immediately under and to expose the maximum amount of solution surface to the action of the air stream. Fig. 4 shows the cell arrangement of the second solid dehydrator which is typical of the first solid dehydrator. Fig. 6 is a plan of the tray 98 of the solution evaporator 133 showing the notched drip edge similar to that of the trays 66 and 69 of the solid dehydrators. Fig. 8 shows the solution evaporator 133 with the solution supply pipe 130, and perforated pipe 131, the trays 98 with the ends bent similar to the trays 66 and 69 and for the purpose of obstructing the air flow as little as possible and to direct the flow of the solution transversely to that of the air. Fig. 8 shows the trays 98 of the solution evaporator 133, with the lower edge of said trays bent down to form the drip edge with notches as described for Fig. 6. The solution flows zigzag on the said trays 98 at right angles to the air flow.

The operation of the system to control temperature and humidity, beginning with a normal air condition is as follows: on a rising temperature of the air in the return duct 13, the thermostat 18 completes a circuit by means of the positive wire 168 and the negative wire 173 to close a switch to supply power to open the motorized valve 145 to allow more cooling water to pass through the supply pipe 142, the branch pipe 143, the cooling coil 63, the pipe 144, and the waste pipe 146, to lower the temperature of the air supplied to the spaces 10 and 14, and on a lowering of the temperature of the air in the said return duct 13, the said thermostat 18 completes a circuit by means of the positive wire 168 and the negative wire 174 to close a switch to supply power to close the said motorized valve 145 to reduce the amount of cooling water allowed to pass through the said cooling coil and pipes to increase the temperature of the air supplied to the said spaces 10 and 14. On a rising temperature of the air in the duct 11, the thermostat 12 completes a circuit by means of the positive wire 168 and the negative wire 175 to close a switch to supply power to move the damper 77 by means of the damper motor 85 to increase the amount of cool air supplied to the said space 10, and on a lowering of the temperature of the air in the said duct 11, the said thermostat 12 completes a circuit by means of the said positive wire 168 and the negative wire 176 to close a switch to supply power to move the said damper 77 by means of the said damper motor 85 to decrease the amount of cool air supplied to the said space 10. On a rising temperature of the air in the duct 15, the thermostat 16 completes a circuit by means of the positive wire 168 and the negative wire 177 to close a switch to supply power to move the damper 79 by means of the damper motor 92 to increase the amount of cool air supplied to the space 14, and on a lowering of the temperature of the air in the said duct 15, the said thermostat 16 completes a circuit by means of the said positive wire 168 and the negative wire 178 to close a switch to supply power to move the said damper 79 by means of the said damper motor 92 to decrease the amount of cool air supplied to the said space 14. On a rising humidity of the air in the return duct 13, the humidostat 17 completes a circuit by means of the positive wire 168 and the negative wire 179 to close a switch to supply power to move the mixing damper 106 by means of the damper motor 112 to increase the proportion of extremely dry air and to decrease the proportion of the normally dry air supplied to the solution evaporator 133 to increase the amount of evaporation, then, after a period of time, mechanism within the said damper motor 112 completes a circuit by means of the postive wire 168 and the negative wire 180 to close a switch to supply power to open the dampers 34 and 35 and to close the dampers 36, 37, and 38 by means of the damper motor 52, then, after a period of time, mechanism within the said damper motor 52 completes a circuit by means of the positive wire 168 and the negative wire 181 to close a switch to supply power to open the motorized valve 150 to increase the amount of cooling water passing through the supply pipe 142, the branch pipe 147, the cooling coil 59, the pipe 148, the cooling coil 54, the pipe 149, and the waste pipe 146, to reduce the humidity, and on a lowering of the humidity of the air in the said return duct 13, the said humidostat 17 completes a circuit by means of the positive wire 168 and the negative wire 184 to close a switch to supply power to move the said mixing damper 106 by means of the said damper motor 112 to decrease the proportion of extremely dry air supplied to the said solution evaporator 133 and to increase the proportion of normally dry air supplied to the said solution evaporator 133, then, after a period of time mechanism within the said damper motor 112 completes the circuit by means of the said positive wire 168 and the negative wires 183 and 184 to close a switch to supply power to close the said dampers 34 and 35 and to open the said dampers 36, 37, and 38, then, after a period of time, mechanism within the said damper motor 52 completes the circuit by means of the positive wire 168 and the negative wires 182, 183, and 184 to close a switch to supply power to close the said motorized valve 150.

In case the humidity of the air in the said return duct 13 falls below a predetermined degree, the said mechanism within the damper motor 112 completes a circuit by means of the positive wire 168 and the negative wire 185 to close a switch to supply power to open the motorized valve 154 to allow tempered water to be taken from the pipe 144 through the pipe 151 the storage tank 152 the pipe 153 and the check valve 155 into the pipe 138 to increase the vapor pressure of the reconcentrated hygroscopic solution 135, and, after a period of time, mechanism within the said motorized valve 154 completes a circuit by means of the positive wire 168 to close a switch to supply power and the negative wire 186 to open the motorized valve 157 to supply steam or hot water to the coil 156 to further increase the vapor pressure of the said tempered water to further increase the vapor pressure of the reconcentrated hygroscopic solution 135, and on an increasing humidity of the air in the said return duct 16, the said humidostat 17 completes a circuit by means of the postive wire 168 and the negative wire 179 to close a switch to supply power to move the mixing damper 106 to decrease the proportion of normally dry air and to increase the proportion of extremely dry air supplied to the solution evaporator 133, and, after a period of time, mechanism within the damper motor 112 completes a circuit by means of the positive wire 168 and the negative wires 179 and 187 to close a switch to supply power to close the said motorized valve 154 to shut off the supply of tempered water to the said reconcentrated solution 135 to reduce the vapor pressure of the said reconcentrated hygroscopic solution, and, after a period of time, mechanism within the said motorized valve 154 completes a circuit by means of the positive wire 168 and the negative wires 179, 187, and 188 to close a switch to supply power to close the said motorized valve 157 to decrease the vapor pressure of the said tempered water. The damper motor shafts are rotated and the valve stems are raised and lowered by means of low voltage, alternating current, shaded pole, variable speed motors and reducing gears which are immersed in oil and are reversible at any point of the damper or valve travel. The power to operate these motors is supplied by the positive wire 168 and the negative wire 169. The time required for reversing the position of the dampers and valves is varied by changing the speed of the motor. The direction of rotation of the motors is controlled by switches located within the mechanism of each motor and these switches are operated by the thermostats and humidostat which under conditions of high temperature or humidity complete a circuit through the positive wire 168 and one of the negative wires to close one of the switches to complete a circuit through the positive wire 168 and the negative wire 169 to move the damper motor or valve in one direction and which under conditions of low temperature or humidity completes a circuit through the positive wire 168 and the other negative wire to close the other switch to complete a circuit through the said positive wire 168 and the said negative wire 169 to move the damper motor or valve in the opposite direction, the first two circuits being broken by the change in temperature or humidity, which changes the action of the thermostatic or humidostatic element and which changes first the control circuit and then the motor circuit. The damper lever shafts and motorized valve shafts have cams which operate limit switches to stop the motor when the damper or valve has reached the end of the travel in either direction. The primary damper motor and motorized valve shafts have a cam at one end of the damper or valve travel which is adjustable in position and which makes a contact through the positive wire 168 and one negative wire to close a switch to supply power through the positive wire 168 and the negative wire 169 to rotate the secondary damper motor or motorized valve shaft in one direction and another cam on the opposite end of the damper or valve travel which is also adjustable in position and which makes a contact through the positive wire 168 and the other negative wire to close another switch to supply power through the positive wire 168 and the negative wire 169 to rotate the secondary damper motor or motorized valve shaft in the opposite direction. Similar cams on the secondary damper motor and motorized valve shafts operate similar circuits and switches to operate the tertiary damper motor and motorized valve shafts in similar directions. The sped of the damper and valve motors is adjustable and is controlled by restricting the oil flow in the oil immersed motor mechanism. The phrase "after a period of time" refers to the time required for the primary or secondary damper and valve shafts to rotate from the position where they previously stopped to the point of the travel required by the thermostat or humidostat before a change in the action of the said thermostat or humidostat occurs.

The previously described dampers and valves can also be operated by low voltage alternating current or compressed air motors of the diaphragm type which are normally held in an open or closed position by means of a spring and are moved in the opposite direction by the operation of the electric motors or compressed air diaphragm motors. The spring tension is adjusted so that the least effort is required to change the direction of the first stage damper or valve and the greatest effort is required to change the direction of the last stage damper or valve. After the conditions of temperature or humidity have been reached the last stage damper or valve changes back to its normal position first and the first stage damper or valve changes back to its normal position last, which is opposite to that upon which the description is based, but which will not materially change the results.

It is not intended to limit the automatic control of the dampers and valves to the particular means described, which is manufactured by the Barber Colman Company, Rockford, Illinois, U. S. A., nor to claim any invention in the mechanism within the said damper motors or motorized valves. They, like fans and pumps, are necessary mechanical parts of an air conditioning system and the detailed description is given in order to enable those skilled in the art to make and use the same.

It is intended that this invention is not limited to the use of calcium chloride alone, but that it may be also used for commercial anhydrous calcium chloride, commercial dihydrate calcium chloride, magnesium chloride, or other hygroscopic solids which are dissolved by the vapors absorbed from the air or gases.

The relative humidity of the air in occupied spaces should be between forty and sixty per cent for ideal comfort conditions. If conditions of equilibrium were established between the vapor pressure of the air at a temperature of 77 degrees, the air in contact with a saturated solution of calcium chloride would have a relative humidity of approximately 28 per cent and the air in contact with dihydrate calcium chloride would have a relative humidity of approximately 5 per cent. The practical limits of dehydration are assumed as 40 per cent for air in contact with a saturated solution and 15 per cent for air in contact with the dihydrate calcium chloride. It is possible to vary the relative humidity of the combined air flow by varying the proportions of the air flow exposed to the saturated solution and to the dihydrate solid to produce air with from 15 to 40 per cent relative humidity.

The absolute humidity of the air in contact with the solid particles of hygroscopic material is further reduced by lowering the vapor pressure of the hygroscopic solid by cooling the air previous to contacting the said hygroscopic solid in each step to lower the temperature of the said hygroscopic solid.

By making one storage space common to both hygroscopic solids and solution, in which the filling can be done at convenient periods, the filling of the containers with the hygroscopic solids is automatic, and the supply of hygroscopic solution to the trays as well as that of the reconcentrated hygroscopic solution is also automatic. It is also apparent that the hygroscopic solids will be held in proper place until dissolved by the vapors in the air and then will automatically drain through the solution carrying members to the collecting tank and carrying with the solution whatever vapors, colloids, pollens, and solids that may have been removed from the air due to contacting hygroscopic and adhesive surfaces of solution. The purpose of the raised drain outlet is to cause these solids to settle in the said collecting tank from which they can be removed.

Air passing through the solid dehydrators has the latent heat converted into sensible heat in two steps and sensible heat removed in two steps which produces extremely dry air with a lowered relative humidity, a lowered absolute humidity, a lowered total heat content or wet bulb temperature, and an increased dry bulb temperature. Air passing through the solution dehydrators has latent heat converted into sensible heat which produces normally dry air with a slightly lowered relative humidity, a slightly lowered absolute humidity, a constant total heat content or wet bulb temperature, and a slightly increased dry bulb temperature.

Under normal conditions the number of grains of moisture to be removed per pound of air circulated may vary from a few grains up to 12 grains. A few grains of moisture may be removed from a pound of air by the solution dehydrators in case all of the air is directed through the solution dehydrators for the smaller load. The number of grains of moisture removed from a pound of air by the solid dehydrators may be three times that required per pound of air circulated which requires that one third of the total amount of air circulated must be drawn through the solid dehydrators without consideration of the amount of work being done by the solution dehydrators.

The normally dry air from the solution dehydrators may have a relative humidity of 40 per cent at a wet bulb temperature corresponding to that of the entering air and may absorb sufficient moisture from the solution in the solution evaporator to increase the relative humidity of the air up to 70 per cent at the same wet bulb temperature.

The extremely dry air from the solid dehydrators may have a relative humidity of 20 per cent at a wet bulb temperature several degrees below that of the entering air and may absorb sufficient moisture from the solution in the solution evaporator to increase the relative humidity of the air up to 70 per cent at a constant wet bulb temperature.

As previously stated, the number of grains of water to be removed per pound of air in the dehydration process may vary from a few up to 12, the number of grains of water per pound of air that may be absorbed by the normally dry air from the solution dehydrators in the solution evaporator may be as high as 15 under the conditions stated, and the number of grains of water per pound of air that may be absorbed by the extremely dry air from the solid dehydrators in the solution evaporator may be as high as 30 under the conditions stated.

What I claim is:

1. A method of air conditioning, which comprises drawing air from one or more enclosures, selectively directing the air in varying proportions along two separate courses defining separate drying zones disposed in parallel dependent upon the degree of dehumidification desired, subjecting the air in one course to direct contact with solid hygroscopic material to liquify the same, draining said liquified hydroscopic solution into said other course to bring the same into contact with air passed along said second course, and directing the conditioned air from said courses into a common course to commingle the same for discharge into said enclosures.

2. A method of air conditioning a flow of air which comprises directing a portion of the air along one course while subjecting it to direct contact with solid hygroscopic material to liquify the same to over dry said portion for the purpose desired, directing another portion of air along a separate and distinct course while subjecting it to direct contact with liquified hygroscopic material removed from said first course to under dry said second portion for the purpose desired, commingling said portions and directing the same along a common course for discharge into an enclosure, and balancing said portions to obtain air of the desired humidity in said common course with a minimum of liquification of said solid material in said first course, and a maximum of dilution of said liquified material in said second course.

HIRAM JOSEPH KAUFMAN.